(12) United States Patent
Okimura et al.

(10) Patent No.: US 9,593,743 B2
(45) Date of Patent: Mar. 14, 2017

(54) GEAR DEVICE

(71) Applicant: NABTESCO CORPORATION, Tokyo (JP)

(72) Inventors: Takayuki Okimura, Mie (JP); Takashi Naruse, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 1 day.

(21) Appl. No.: 14/722,595

(22) Filed: May 27, 2015

(65) Prior Publication Data
US 2015/0345593 A1 Dec. 3, 2015

(30) Foreign Application Priority Data

May 30, 2014 (JP) ................................ 2014-112921

(51) Int. Cl.
*F16H 1/32* (2006.01)

(52) U.S. Cl.
CPC .......... *F16H 1/32* (2013.01); *F16H 2001/323* (2013.01)

(58) Field of Classification Search
CPC ................. F16H 1/32; F16H 2001/323; F16H 2001/325; F16H 2001/327
See application file for complete search history.

(56) References Cited

U.S. PATENT DOCUMENTS

| | | | | |
|---|---|---|---|---|
| 8,029,400 | B2 * | 10/2011 | Nakamura | B25J 9/102 475/162 |
| 8,382,629 | B2 * | 2/2013 | Hirata | F16H 1/32 475/162 |
| 2001/0044356 | A1 * | 11/2001 | Takeuchi | F16H 1/32 475/178 |
| 2009/0062053 | A1 * | 3/2009 | Kobayashi | F16H 1/32 475/166 |
| 2009/0124446 | A1 * | 5/2009 | Miyoshi | F16H 1/32 475/163 |
| 2010/0056316 | A1 * | 3/2010 | Hibino | F16H 1/32 475/162 |
| 2014/0196554 | A1 * | 7/2014 | Kato | F16H 1/32 74/89.16 |

FOREIGN PATENT DOCUMENTS

| | | |
|---|---|---|
| JP | H09-57678 A | 3/1997 |
| JP | 2001-323972 A | 11/2001 |

* cited by examiner

*Primary Examiner* — Jacob S Scott
(74) *Attorney, Agent, or Firm* — Pillsbury Winthrop Shaw Pittman LLP (57) ABSTRACT

A gear device includes: a crankshaft that has an eccentric portion; an oscillation gear that has a plurality of external teeth and oscillating and rotating due to rotation of the eccentric portion; a carrier that rotatably supports the crankshaft; an outer cylinder that has a plurality of internal teeth respectively engaged with the external teeth of the oscillation gear; and a cylindrical portion that extends through the oscillation gear, the carrier, and the outer cylinder, wherein the carrier and the outer cylinder coaxially and relatively rotate due to oscillation and rotation of the oscillation gear, and wherein the cylindrical portion is disposed in either a rotational state, in which the cylindrical portion rotates, or a stationary state, in which the cylindrical portion does not rotate, depending on relative rotation of the carrier and the outer cylinder.

5 Claims, 7 Drawing Sheets

GEAR DEVICE

TECHNICAL FIELD

The present invention relates to a gear device having a cylindrical portion.

BACKGROUND ART

Conventionally, a gear device having a cylindrical portion that extends in an axial direction of the gear device is known. This gear device allows various types of cables or the like to be routed through the cylindrical portion.

Japanese Unexamined Patent Publication No. H9-57678 describes a slewing structure. The structure includes a crank pin, a pinion that has a plurality of outer teeth and that is swung and rotated as the crank pin is rotated, a case that has a plurality of pin teeth engaged with the individual outer teeth of the pinion, and a flange that rotatably supports the crank pin. In the slewing structure, while the case is secured to a stationary portion of a robot, the pinion is swung and rotated. As a result, the flange is rotated. The slewing structure also includes a cylindrical portion that extends through the pinion, the case, and the flange disposed in an axial direction of the slewing structure. The cylindrical portion is secured to the flange.

Japanese Unexamined Patent Publication No. 2001-323972 describes an eccentric swing type speed reducer that includes a crankshaft, an outer tooth gear that is swung and rotated as the crankshaft is rotated, an inner tooth portion engaged with the outer tooth gear, and a rotation portion that rotatably supports the crankshaft. In the eccentric swing type speed reducer, while the inner tooth portion is secured to a first joint portion, the outer tooth gear is swung and rotated. Thus, the rotation portion is rotated. The eccentric swing type speed reducer also includes a protection tube that extends through the outer tooth gear, the inner tooth portion, and the rotation portion in an axial direction of the eccentric swing type speed reducer. The protection tube is secured to the inner tooth portion through the first joint portion.

In the slewing structure described in Patent Literature 1, the cylindrical portion is secured to the flange that is disposed on a rotational side of the slewing structure. In other words, while the flange is rotated, the cylindrical portion is also rotated. Thus, for example, when a cable routed in the cylindrical portion is secured to the case disposed on the stationary side of the slewing structure so that the cable is not displaced relative to the case, the cable and an inner peripheral surface of the cylindrical portion are rubbed against each other.

On the other hand, in the eccentric swing type speed reducer described in Patent Literature 2, the protection tube is secured to the inner tooth portion disposed on a stationary side of the eccentric swing type speed reducer. In other words, while the rotation portion is rotated, the protection tube is kept in a stationary state. Thus, for example, when the cable routed in the protection tube is displaced relative to the inner tooth portion disposed on the stationary side of the eccentric swing type speed reducer, the cable and an inner peripheral surface of the protection tube are rubbed against each other.

Thus, depending on how a cable is used in the stewing structure described in Patent Literature 1 and the eccentric swing type speed reducer described in Patent Literature 2, the cable is rubbed against the inner peripheral surface of the cylindrical portion or the inner peripheral surface of the protection tube. As a result, the cable may be damaged.

SUMMARY OF INVENTION

The present invention is made from the foregoing point of view. An object of the present invention is to provide a gear device that can prevent a substance inserted into a cylindrical portion from being damaged.

A gear device according to the present invention includes: A gear device comprising: a crankshaft that has an eccentric portion; an oscillation gear that has a plurality of external teeth and oscillating and rotating due to rotation of the eccentric portion; a carrier that rotatably supports the crankshaft; an outer cylinder that has a plurality of internal teeth respectively engaged with the external teeth of the oscillation gear; and a cylindrical portion that extends through the oscillation gear, the carrier, and the outer cylinder in an axial direction of the outer cylinder, wherein the carrier and the outer cylinder coaxially and relatively rotate due to oscillation and rotation of the oscillation gear, and the cylindrical portion is disposed in either a rotational state, in which the cylindrical portion rotates, or a stationary state, in which the cylindrical portion does not rotate, depending on relative rotation of the carrier and the outer cylinder.

DESCRIPTION OF EMBODIMENT

Next, with reference to the accompanying drawings, an embodiment of the present invention will be described. The following embodiment is an example in which the present invention is specifically embodied, but the embodiment does not limit the scope of the present invention.

The individual figures, to which the following description refers, simplify principal portions of structural portions of a gear device X1 according to the present embodiment for the sake of convenience. Thus, the gear device X1 according to the present embodiment may include any structural portions not illustrated in the individual figures to which the specification refers.

Figure 1:
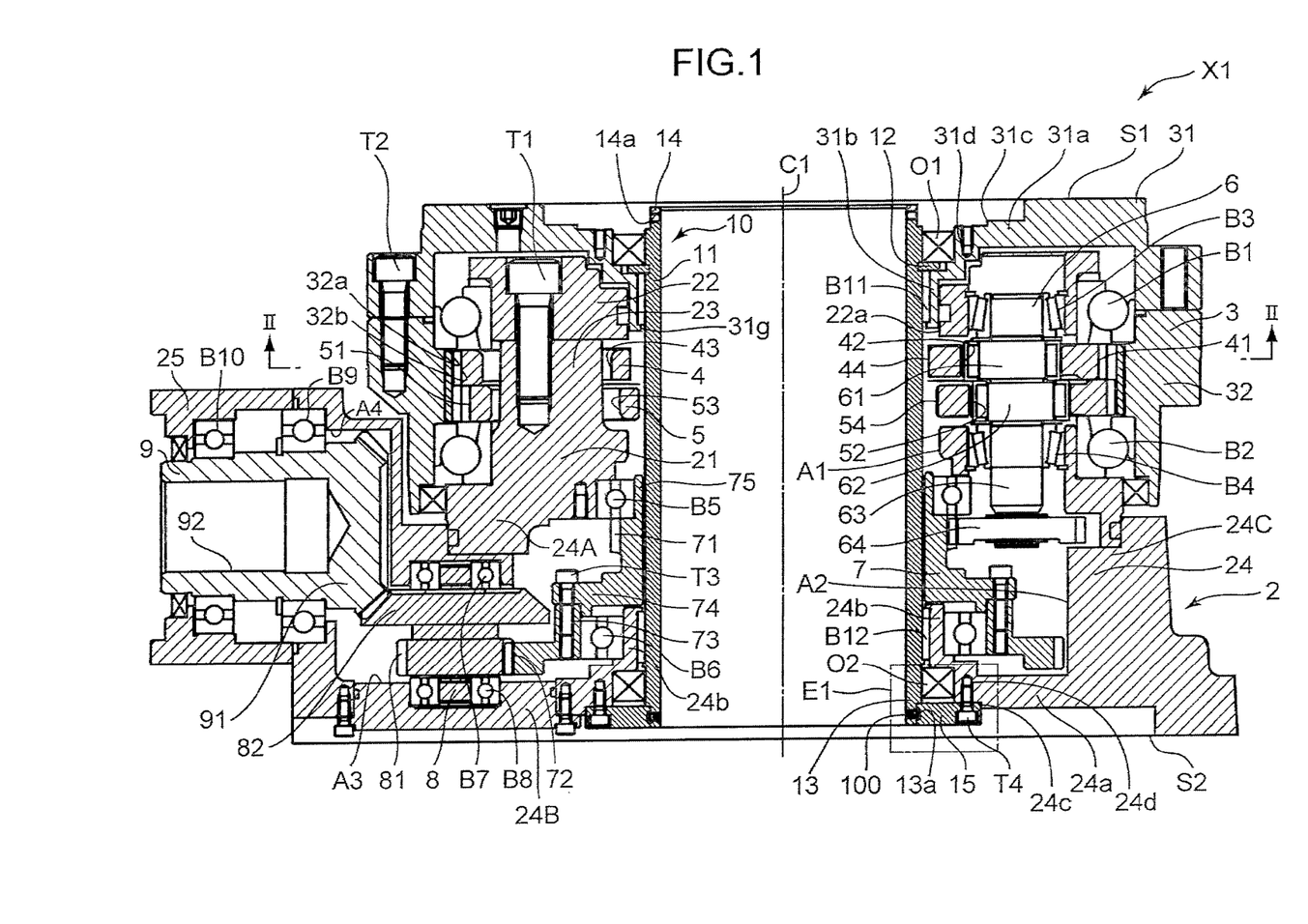
FIG. 1 is a sectional view illustrating an outlined structure of a gear device according to an embodiment of the present invention, a cylindrical portion being kept in a stationary state.
Figure 2:
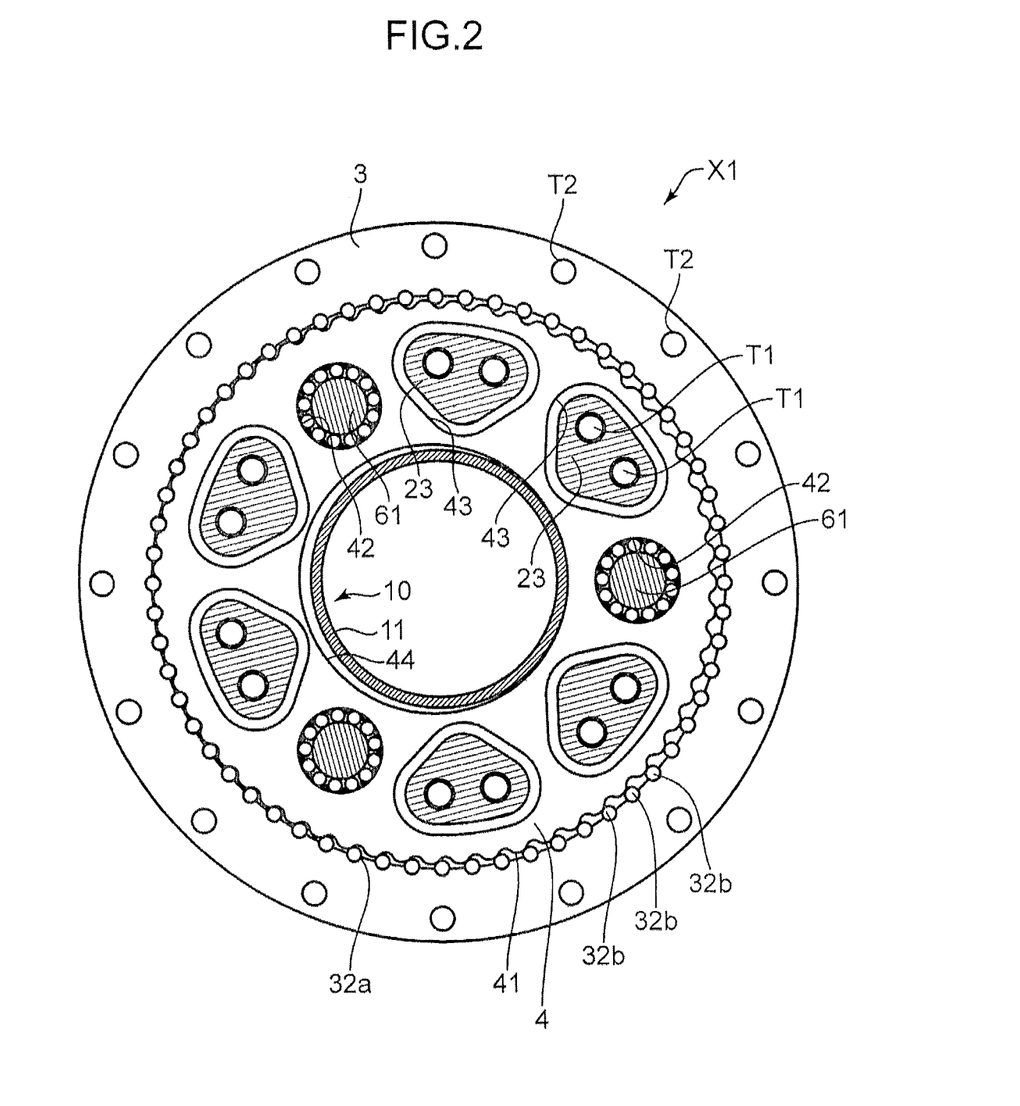
FIG. 2 is a sectional view taken along line II-II illustrated in FIG. 1.

As illustrated in FIG. 1 and FIG. 2, the gear device X1 mainly includes a carrier 2, an outer cylinder 3, oscillation gears 4 and 5, a crankshaft 6, a transmission gear 7, an axial direction conversion unit 8, an input shaft 9, and a cylindrical portion 10.

In the gear device X1, torque that is input from a direction perpendicular to a center axis C1 of the gear device X1 is converted into torque in a direction parallel with the center axis C1 by the axial direction conversion unit 8. As the converted torque is transferred to the oscillation gears 4 and 5 through the transmission gear 7 and the crankshaft 6, the oscillation gears 4 and 5 are swung and rotated. As a result, the outer cylinder 3 is rotated relative to the carrier 2 around the center axis C1.

The carrier 2 is a portion disposed on the stationary side of the gear device X1 according to the present embodiment. The carrier 2 is disposed around the center axis C1 of the gear device X1. The carrier 2 has a base plate portion 21, an end plate portion 22, and a plurality of shaft portions 23. According to the present embodiment, the base plate portion 21 and the individual shaft portions 23 are integrally formed. The end plate portion 22 is however formed independently from the base plate portion 21 and the individual shaft portions 23. The end plate portion 22 is tightened to the individual shaft portions 23 by a plurality of first tightening portions T1. Alternatively, the base plate portion 21, the individual shaft portions 23, and the end plate portion 22 may be independent portions. In this case, the base plate portion 21, the individual shaft portions 23, and the end plate portion 22 are tightened by, for example, the plurality of first tightening portions T1.

The base plate portion 21 is a portion that functions as a pedestal portion of the carrier 2. The base plate portion 21 is disposed opposite to the end plate portion 22 through the oscillation gears 4 and 5 in the direction of the center axis C1. The base plate portion 21 has a main body portion 24 and a protrusion portion 25 that protrudes from a side surface of the main body portion 24.

The main body portion 24 is a portion that encloses a part of the cylindrical portion 10, a part of the crankshaft 6, the transmission gears 7, and the axial direction conversion unit 8. Specifically, formed in the main body portion 24 are a first space A1, a second space A2, a third space A3, and a crankshaft hole. The first space A1 is a space that is formed in a center portion of the main body portion 24 in the direction of the center axis C1. Enclosed in the first space A1 is a part of the cylindrical portion 10. The second space A2 is a space that coaxially surrounds the first space A1 at a center portion in an axial direction of the first space A1. The second space A2 encloses the transmission gear 7 disposed on a periphery of the cylindrical portion 10. The third space A3 radially extends from the second space A2 and has an opening in a side surface of the main body portion 24. Disposed in the third space A3 is the axial direction conversion unit 8. The crankshaft hole is a hole that is formed on a periphery of the first space A1 and that extends in the direction of the center axis C1. Enclosed in the crankshaft hole of the main body portion 24 are a shaft main body 63 and a shaft gear 64 of the crankshaft 6.

Based on the foregoing structure, formed in the main body portion 24 are the first space A1, the second space A2, the third space A3, and the crankshaft hole. In addition, the main body portion 24 has a one side portion 24A located on one side in an axis direction of the second space A2 (on the end plate portion 22 side illustrated in FIG. 1), another side portion 24B located on another side in the axial direction of the second space A2, and a connection portion 24C that connects the one side portion 24A and the other side portion 24B. Formed at a part of the connection portion 24C is the third space A3 that radially extends.

The other side portion 24B of the main body portion 24 has an axial end surface that composes a bottom surface S2 of the gear device X1. The other side portion 24B includes a first securing portion 24a and a first supporting portion 24b.

The first securing portion 24a of the other side portion 24B is a portion that secures the cylindrical portion 10. An end surface of the first securing portion 24a is recessed in a step shape from the bottom surface S2 in the direction of the center axis C1.

The first supporting portion 24b extends from an end portion of the first securing portion 24a, the end portion being disposed on of the center axis C1 side, to the end plate portion 22 in the direction of the center axis C1. The first supporting portion 24b supports the cylindrical portion 10. In addition, the first supporting portion 24b supports the transmission gear 7.

The protrusion portion 25 is a portion that encloses the input shaft 9. The protrusion portion 25 is formed on the side surface of the main body portion 24. Specifically, formed in the protrusion portion 25 is a fourth space A4. The fourth space A4 is a space that is formed in the protrusion portion 25 in the direction perpendicular to the center axis C1. The fourth space A4 encloses the input shaft 9. The fourth space A4 is connected to the third space A3, which has an opening in the side surface of the main body portion 24.

The end plate portion 22 is disposed opposite to the base plate portion 21 through the oscillation gears 4 and 5 in the direction of the center axis C1. The end plate portion 22 has an end-plate through-hole 22a and the crankshaft hole. The end-plate through-hole 22a is a hole that is formed in a center portion of the end plate portion 22 in the direction of the center axis C1 and that is connected to the first space A1 formed in the main body portion 24 of the base plate portion 21. The crankshaft hole of the end plate portion 22 is a hole formed on a periphery of the end plate portion 22 and is connected to the crankshaft hole formed in the body portion 24 of the base plate portion 21.

Each of the shaft portions 23 extends in the axial direction of the base plate portion 21 and the end plate portion 22 and connects the base plate portion 21 and the end plate portion 22. Specifically, each of the shaft portions 23 is disposed between the one side portion 24A of the main body portion 24 of the base plate portion 21 and the end plate portion 22. One end of each of the shaft portions 23 is connected to the one side portion 24A of the main body portion 24. Another end of each of the shaft portions 23 is secured to the end plate portion 22 by the first tightening portion T1. The individual shaft portions 23 are disposed on a periphery of the carrier 2 spaced apart from the center axis C1 for a predetermined distance. According to the present embodiment, the number of shaft portions 23 is six. Alternatively, the number of shaft portions 23 may be changed accordingly depending on how the gear device X1 is used.

The input shaft 9 is a portion to which torque is input from, for example, an external motor. The input shaft 9 is enclosed in the fourth space A4 formed in the protrusion portion 25 of the base plate portion 21 and extends in the direction perpendicular to the center axis C1. Disposed between the input shaft 9 and the protrusion portion 25 are a pair of bearings B9 and B10 that are spaced apart from each other in the axial direction of the input shaft 9. The bearings B9 and B10 allow the input shaft 9 that has an axis perpendicular to the center axis C1 to be rotated around the axis.

The input shaft 9 has an input gear 91 and an input hole 92. The input gear 91 is disposed at an end portion of the input shaft 9, the end portion being disposed on the main body portion 24 side, in the direction perpendicular to the center axis C1. The input hole 92 is a hole into which, for example, an output shaft of an external motor is inserted. Torque of the output shaft, which is inserted into the input hole 92, of the external motor is input to the input shaft 9.

The axial direction conversion unit 8 converts input torque of the input shaft 9 into torque in the direction of the center axis C1. The axial direction conversion unit 8 is enclosed in the third space A3 formed in the main body portion 24 of the base plate portion 21. The axial direction conversion unit 8 axially extends in the direction of the center axis C1. Disposed between the axial direction conversion unit 8 and the carrier 2 are a pair of bearings B7 and B8 that are spaced apart from each other in the axial direction of the axial direction conversion unit 8. The bearing B7 is mounted on the one side portion 24A of the main body portion 24. The bearing B8 is mounted on the other side portion 24B of the main body portion 24. The bearings B7 and B8 allow the axial direction conversion unit 8 that has an axis in parallel with the center axis C1 to be rotated around the axis of the axial direction conversion unit 8.

The axial direction conversion unit 8 has an outer tooth gear 81 and an axial direction conversion gear 82. The axial direction conversion gear 82 is engaged with the input gear 91 of the input shaft 9 enclosed in the fourth space A4 through an opening of the third space A3 formed on the side surface of the base plate portion 21. The outer tooth gear 81 is a gear that is coaxially rotated relative to the axial direction conversion gear 82 and is disposed further toward the side of the bottom surface S2 than the axial direction conversion gear 82 in the direction of the center axis C1.

The transmission gear 7 transfers input torque of the input shaft 9 to each of the crankshafts 6 through the outer tooth gear 81 of the axial direction conversion unit 8. The transmission gear 7 is disposed on the periphery of the first space A1 formed in the main body portion 24 that encloses the cylindrical portion 10. The transmission gear 7 is enclosed in the second space A2 of the main body portion 24.

The transmission gear 7 has a first gear 71, a second gear 72, a tightened portion 73, a tightening portion 74, and an extension portion 75.

The first gear 71 is rotated around the center axis C1. Like the first gear 71, the second gear 72 is rotated around the center axis C1. The second gear 72 has an outer diameter that is greater than the first gear 71. The second gear 72 is radially engaged with the outer tooth gear 81 of the axial direction conversion unit 8. The tightened portion 73 is a portion integrally that is formed with the second gear 72 and that extends from an inner peripheral portion of the second gear 72 to the first gear 71 side (on an upper side in FIG. 1) in the direction of the center axis C1. The tightening portion 74 is a portion that is integrally formed with the first gear 71 and that tightens the tightened portion 73 through a third tightening portion T3. The extension portion 75 is a portion that extends from an inner peripheral portion of the first gear 71 to the end plate portion 22 side (on the upper side in FIG. 1) in the direction of the center axis C1.

Disposed between the transmission gear 7 and the carrier 2 are a pair of bearings B5 and B6 that are spaced apart from each other in an axial direction of the transmission gear 7. The bearing B5 is disposed between the one side portion 24A of the main body portion 24 and the extension portion 75 of the transmission gear 7. The bearing B6 is disposed between the first supporting portion 24b of the other side portion 24B and the tightened portion 73 of the transmission gear 7. These bearings B5 and B6 allow the transmission gear 7 to be rotated relative to the carrier 2 around the center axis C1.

Each of the crankshafts 6 is a portion to which rotation torque is transferred from the first gear 71 of the transmission gear 7. The individual crankshafts 6 are disposed on a periphery of the carrier 2 at equal intervals so that the crankshafts 6 are spaced apart from the center axis C1 by a predetermined distance. Each of the crankshafts 6 is inserted into the crankshaft holes of the base plate portion 21 and the end plate portion 22. The crankshafts 6 axially extend in the direction of the center axis C1. Disposed between each of the crankshafts 6 and the carrier 2 are a pair of crankshaft bearings B3 and B4 that are spaced apart from each other in the axial direction of the crankshafts 6. The crankshaft bearings B3 and B4 allow the crankshaft 6 that has an axis in parallel with the center axis C1 to be coaxially rotated around the axis of the crankshafts 6. According to the present embodiment, the number of crankshafts 6 is three. Alternatively, the number of crankshafts 6 may be changed accordingly depending on how the gear device X1 is used.

Each of the crankshafts 6 has eccentric portions 61 and 62, a shaft main body 63, and a shaft gear 64.

The shaft main body 63 is a portion that composes a shaft of the crankshaft 6 and extends in the direction of the center axis C1.

The first eccentric portion 61 and the second eccentric portion 62 each have a cylindrical shape. The first eccentric portion 61 and the second eccentric portion 62 are integrally formed with the shaft main body 63, with both these portions being eccentric to the shaft main body 63. The first eccentric portion 61 and the second eccentric portion 62 are eccentric to the axial center of the shaft main body 63 by predetermined eccentric amounts so that the first eccentric portion 61 and the second eccentric portion 62 have a phase difference of a predetermined angle.

The shaft gear 64 is mounted at an axial end portion of the shaft main body 63, the axial end portion being disposed on the bottom surface S2 side. The shaft gear 64 is radially engaged with the first gear 71 of the transmission gear 7.

As the crankshafts 6 are rotated, the oscillation gears 4 and 5 are oscillated and rotated. The oscillation gears 4 and 5 are disposed between the base plate portion 21 and the end plate portion 22 in the direction of the center axis C1.

The first oscillation gear 4 has a first outer tooth portion 41 and a plurality of insertion holes 42 to 44.

The first outer tooth portion 41 has a gentle wave shape that is formed continuously on the periphery of the first oscillation gear 4. Each of the insertion holes 42 is a hole into which the first eccentric portion 61 of each of the crankshafts 6 is inserted. As the first eccentric portion 61 inserted into the insertion hole 42 is rotated, the first oscillation gear 4 is oscillated and rotated. Each of the insertion holes 43 is a hole into which each of the shaft portions 23 is inserted. The insertion hole 43 has a diameter slightly greater than an outer diameter of each of the shaft 23. The insertion hole 44 is a hole into which the cylindrical portion 10 is inserted and has a diameter slightly greater than an outer diameter of the cylindrical portion 10.

The second oscillation gear 5 has a structure identical to that of the first oscillation gear 4. Specifically, the second oscillation gear 5 has a second outer tooth portion 51 and a plurality of insertion holes 52 to 54. The second eccentric portion 62 of the crankshaft 6 is inserted into the insertion hole 52. Each of the shaft portions 23 is inserted into each of the insertion holes 53. Each of the insertion holes 53 has a diameter slightly greater than an outer diameter of each of the shaft portions 23. The cylindrical portion 10 is inserted into the insertion hole 54. The insertion hole 54 has a diameter slightly greater than the outer diameter of the cylindrical portion 10.

According to the present embodiment, two oscillation gears of the first oscillation gear 4 and the second oscillation gear 5 that have a phase difference of a predetermined angle are provided. Alternatively, one or three or more oscillation gears may be provided.

The outer cylinder 3 is a portion disposed on the rotational side of the gear device X1 according to the present embodiment. The outer cylinder 3 is disposed on a side opposite to the bottom surface S2 in the direction of the center axis C1 so that the outer cylinder 3 encloses the end plate portion 22, the oscillation gears 4 and 5, and a part of the main body portion 24. Disposed between the outer cylinder 3 and the carrier 2 in the outer cylinder 3 are a pair of main bearings B1 and B2 that are spaced apart from each other in the direction of the center axis C1. The main bearings B1 and B2 allow the carrier 2 and the outer cylinder 3 to be rotated relative thereto.

The outer cylinder 3 has a first portion 31 and a second portion 32. The first portion 31 and the second portion 32 are mutually secured by a plurality of second tightening portions T2 disposed equally on a periphery of the outer cylinder 3.

The first portion 31 has an axial end surface that composes an upper surface S1 of the gear device X1. The first portion 31 has a structure identical to that of the other side portion 24B disposed in the main body portion 24 of the carrier 2. Specifically, the first portion 31 includes a second securing portion 31a and a second supporting portion 31b.

The second securing portion 31a of the first portion 31 is a portion that can secure the cylindrical portion 10. An end surface of the second securing portion 31a is recessed in a step shape from the upper surface S1 in the direction of the center axis C1.

The second supporting portion 31b is a portion that supports the cylindrical portion 10. The second supporting portion 31b extends from an end portion of the second securing portion 31a, the end portion being disposed on the center axis C1 side, to the bottom surface S2 side in the direction of the center axis C1. A hole surrounded by the second supporting portion 31b is a through-hole 31g of the first portion 31.

The second portion 32 is disposed on one side of the first portion 31 in the direction of the center axis C1 (on a lower side of the first portion 31 in FIG. 1). The second portion 32 has a cylindrical shape having a hollow portion that is connected to a through-hole 31g of the first portion 31. An inner peripheral surface of the second portion 32 peripherally surrounds the oscillation gears 4 and 5. The second portion 32 has an inner diameter slightly greater than each of the outer diameters of the oscillation gears 4 and 5.

The second portion 32 has a plurality of grooves 32a and a plurality of internal teeth 32b. The groove 32a is formed on the peripheral surface of the second portion 32.

The groove 32a extends in the direction of the center axis C1 and has a semicircular sectional shape perpendicular to the direction of the center axis C1. The groove 32a is disposed equally on the periphery of the outer cylinder 3.

The internal tooth 32b is attached to the groove 32a of the second portion 32. Specifically, the internal teeth 32b are inserted into the grooves 32a so that the internal teeth 32b extend in the direction of the center axis C1. Thus, the internal teeth 32b are disposed equally on the periphery of the outer cylinder 3. The number of internal teeth 32b is greater than the number of teeth of the first outer tooth portion 41 and the number of teeth of the second outer tooth portion 51. The oscillation gears 4 and 5 are swung and rotated so that the external teeth 41 and 51 are engaged with the internal teeth 32b. As a result, the outer cylinder 3 is rotated around the center axis C1.

The cylindrical portion 10 extends through the carrier 2, the outer cylinder 3, and the oscillation gears 4 and 5 in the direction of the center axis C1. Inserted into the cylindrical portion 10 is, for example, a cable or the like.

The cylindrical portion 10 has a cylindrical main body 11 and a secured portion 15.

The cylindrical main body 11 of the cylindrical portion 10 is a principal portion having a cylindrical shape and has a constant outer diameter except for both axial end portions. The cylindrical main body 11 axially extends through the through-hole 31g formed in the first portion 31 of the outer cylinder 3, the end-plate through-hole 22a formed in the end plate portion 22, the insertion holes 44 and 45 formed in the oscillation gears 4 and 5, and the first space A1 formed in the main body portion 24 of the base plate portion 21.

Disposed between the cylindrical main body 11 and the second supporting portion 31b formed on the first portion 31 of the outer cylinder 3 is a bearing B11. Disposed between the cylindrical main body 11 and the first supporting portion 24b formed on the other side portion 24B of the main body portion 24 is a bearing B12. The bearings B11 and B12 allow the cylindrical main body 11 to be rotated relative to the carrier 2 and the outer cylinder 3.

A stop ring 12 that peripherally surrounds the cylindrical main body 11 is mounted on the outer peripheral surface of the cylindrical main body 11. The cylindrical main body 11 is aligned in the direction of the center axis C1 by the stop ring 12.

Specifically, while the stop ring 12 is mounted on an outer peripheral surface of the cylindrical main body 11, the cylindrical main body 11 is inserted into the through-hole 31g, the end-plate through-hole 22a, the insertion holes 44 and 54, and the first space A1 from the upper surface S1 side in the direction of the center axis C1. At a contact position where the stop ring 12 is brought into contact with an end surface of the second securing portion 31a in the direction of the center axis C1, the cylindrical main body 11 is aligned. At the contact position, a one end portion of the cylindrical main body 11 is located closer to the end plate portion 22 than the bottom surface S2 on the bottom surface S2 side in the direction of the center axis C1. In addition, at the contact position, another other end portion of the cylindrical main body 11 is located closer to the base plate portion 21 than the upper surface S1 on the upper surface S1 side in the direction of the center axis C1. When the cylindrical main body 11 is inserted from the bottom surface S2 in the direction of the center axis C1, the cylindrical portion 10 is aligned at a contact position where the stop ring 12 is brought into contact with the end surface of the first securing portion 24a of the other side portion 24B.

The cylindrical main body 11 has a third securing portion 13 and a fourth securing portion 14.

The third securing portion 13 is a one side portion of the cylindrical main body 11, the one end portion being disposed on the bottom surface S2 side in the direction of the center axis C1. The third securing portion 13 is a portion to which the secured portion 15 is secured. The third securing portion 13 has a first female thread hole 13a formed therethrough in the direction perpendicular to the center axis C1.

The fourth securing portion 14 is another end portion of the cylindrical main body 11, the other end portion being disposed on the upper surface S1 side in the direction of the center axis C1. The fourth securing portion 14 is a portion by which the secured portion 15 is secured. The fourth securing portion 14 has a second female thread hole 14a in the direction perpendicular to the center axis C1. According to the present embodiment, an outer diameter of the fourth securing portion 14 is equal to an outer diameter of the third securing portion 13.

Disposed between the cylindrical main body 11 and the outer cylinder 3 and between the cylindrical main body 11 and the carrier 2 are a pair of oil seals O1 and O2 opposite to each other in the direction of the center axis C1. Specifically, the oil seal O1 is mounted on the second securing portion 31a of the first portion 31 disposed on the outer cylinder 3. The oil seal O1 is brought into contact with a portion of the cylindrical main body 11 closer to the bearing B11 than the fourth securing portion 14 in the direction of the center axis C1. The oil seal O2 is mounted on the first securing portion 24a of the other side portion 24B disposed on the main body portion 24. The oil seal O2 is brought into contact with a portion of the cylindrical main body 11 closer to the bearing B12 than the third securing portion 13 in the direction of the center axis C1.

Figure 4:
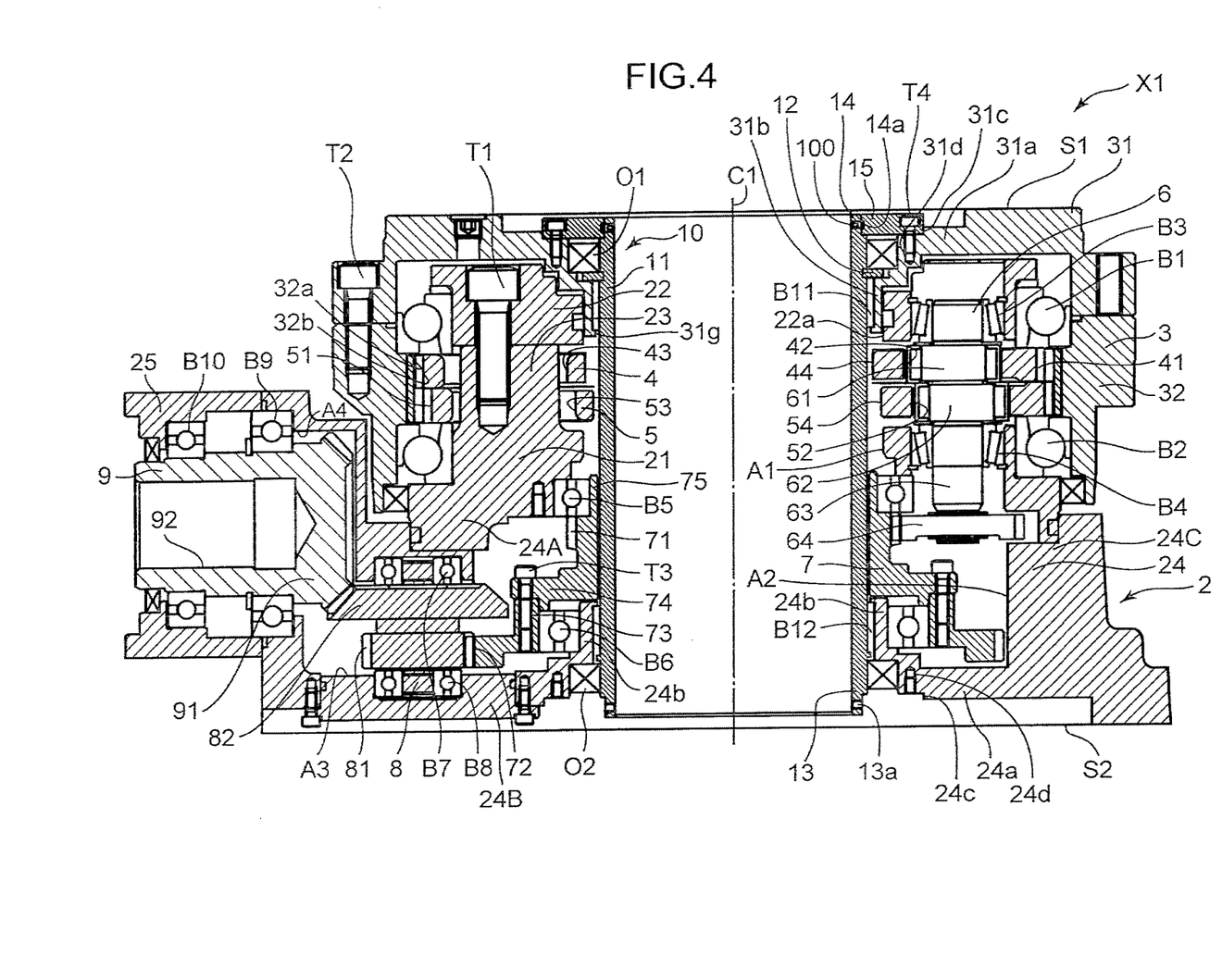
FIG. 4 is a sectional view illustrating an outlined structure of the gear device according to the present embodiment, with a cylindrical portion being in a rotational state.

The secured portion 15 is a portion independent from the cylindrical main body 11. The secured portion 15 extends in an outer radial direction of the cylindrical main body 11. According to the present embodiment, the secured portion 15 has a ring shape and an inner diameter slightly greater than each of outer diameters of the third securing portion 13 and the fourth securing portion 14. While the secured portion 15 is prevented from being rotated relative to the cylindrical main body 11, the secured portion 15 is secured to the cylindrical main body 11. While the cylindrical main body 11 is aligned at the contact position where the stop ring 12 is brought into contact with the end surface of the second securing portion 31a, the secured portion 15 can be secured to the first securing portion 24a of the other side portion 24B disposed on the carrier 2 as illustrated in FIG. 1. In addition, as illustrated in FIG. 4, the secured portion 15 can be secured to the second securing portion 31a of the first portion 31 disposed on the outer cylinder 3.

Figure 3:
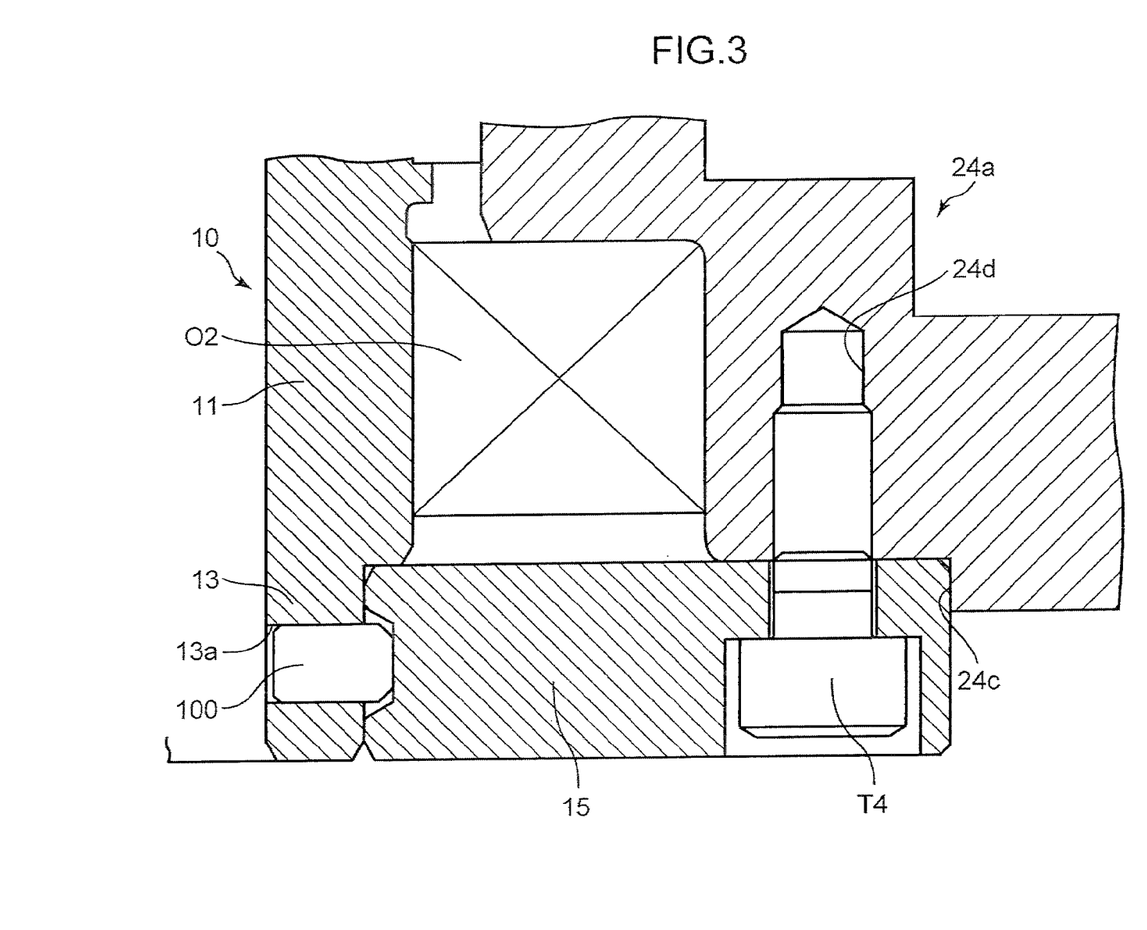
FIG. 3 is an enlarged view illustrating a region E1 surrounded by dashed lines illustrated in FIG. 1.

FIG. 3 is a schematic diagram enlarging a region E1 surround by dashed lines illustrated in FIG. 1. As illustrated in FIG. 3, the first securing portion 24a has a first contact surface 24c and a plurality of first fastening holes 24d.

The first contact surface 24c is composed of a portion where the end surface of the first securing portion 24a is recessed in a step shape. Specifically, a part of the end surface of the first securing portion 24a is recessed in a step shape on the upper surface S1 side in the direction of the center axis C1. A side surface opposite to the third securing portion 13 in the direction perpendicular to the center axis C1 of the step-down portion is the first contact surface 24c. The secured portion 15 is located between the third securing portion 13 and the first contact surface 24c in the direction perpendicular to the center axis C1. A male screw 100 that composes a detent portion is inserted into the first female thread hole 13a of the third securing portion 13. The secured portion 15 is pressed to the first contact surface 24c by the male screw 100 threadedly fitted to the first female thread hole 13a. As a result, the secured portion 15 is secured to the cylindrical main body 11 so that the secured portion 15 is prevented from being rotated relative to the cylindrical main body 11. In this state, the oil seal O2 is covered by the secured portion 15 on the bottom surface S2 side.

According to the present embodiment, since the secured portion 15 is brought into contact with the first contact surface 24c of the first securing portion 24a, the secured portion 15 is prevented from being rotated relative to the cylindrical main body 11. Alternatively, the secured portion 15 may be brought into contact with a part of the outer peripheral surface of the cylindrical main body 11 so as to prevent the secured portion 15 from being rotated relative to the cylindrical main body 11.

According to the present embodiment, the male screw 100 is used for a detent portion. The male screw 100 prevents the cylindrical main body 11 from being rotated relative to the cylindrical main body 11. Alternatively, an O ring may be used for the detent portion. The O ring may prevent the secured portion 15 from being rotated relative to the cylindrical main body 11. Further alternatively, the cylindrical main body may have a step-down portion. The secured portion 15 may have a protrusion portion corresponding to the step-down portion. The protrusion portion may be fitted to the step-down portion so as to prevent the secured portion 15 from being rotated relative to the cylindrical main body 11.

Fourth tightening portions T4 are inserted into the first fastening holes 24d through the secured portion 15. The first fastening holes 24d are formed in the end surface of the first securing portion 24a and extend in the direction of the center axis C1. In addition, the first fastening holes 24d are formed on the end surface of the first securing portion 24a so that the first fastening holes 24d overlap with the secured portion 15 in the direction of the center axis C1. The fourth tightening portions T4 are inserted into the first fastening holes 24d through the secured portion 15 so that the secured portion 15 is secured to the first securing portion 24a. According to the present embodiment, the first fastening holes 24d are formed on a periphery of the first securing portion 24a at intervals of a predetermined distance. The number of first fastening holes 24d is not limited. The number of first fastening holes 24d may be changed accordingly depending on, for example, the shape of the secured portion 15.

Thus, in the gear device X1 illustrated in FIG. 1 to FIG. 3, the entire cylindrical portion 10 is secured to the carrier 2 disposed on the stationary side of the gear device X1 so that the entire cylindrical portion 10 is prevented from being rotated relative to the carrier 2. As a result, when the outer cylinder 3 is coaxially rotated relative to the carrier 2, the cylindrical portion 10 is kept in the stationary state.

In contrast, when the state of the gear device X1 illustrated in FIG. 1 to FIG. 3 is changed to a state as illustrated in FIG. 4, the secured portion 15 is prevented from being rotated relative to the cylindrical main body 11. In addition, the secured portion 15 is secured to the second securing portion 31a disposed on the first portion 31 of the outer cylinder 3.

Specifically, the second securing portion 31a has a structure identical to that of the first securing portion 24a. In other words, the second securing portion 31a has a second contact surface 31c and a plurality of second fastening holes 31d. According to the present embodiment, the second contact surface 31c and the second fastening holes 31d are disposed opposite to the first contact surface 24c and the first fastening holes 24d, respectively, in the direction of the center axis C1.

The secured portion 15 is located between the fourth securing portion 14 and the second contact surface 31c in the direction perpendicular to the direction of the center axis C1. The secured portion 15 is pressed to the second contact surface 31c by the male screw 100 threadedly fitted to the second female thread hole 14a. The fourth tightening portion T4 is inserted into the second fastening holes 31d through the secured portion 15. As a result, the secured portion 15 is secured to the second securing portion 31a. In this state, the oil seal O1 is covered by the secured portion 15 on the upper surface S1 side. Thus, in the gear device X1 illustrated in FIG. 4, while the entire cylindrical portion 10 is prevented from being rotated relative to the outer cylinder 3 disposed on the rotational side of the gear device X1, the entire cylindrical portion 10 is secured to the outer cylinder 3. Thus, when the outer cylinder 3 is coaxially rotated relative to the carrier 2, the cylindrical portion 10 is kept in the rotational state.

According to the present embodiment, the second fastening holes 31d are peripherally formed on the second securing portion 31a at intervals of a predetermined distance. A distance from the center axis C1 to each of the second fastening holes 31d is equal to a distance from the center axis C1 to each of the first fastening holes 24d. Thus, a distance from the outer peripheral surface of the third securing portion 13 disposed on the cylindrical main body 11 to each of the first fastening hole 24d is identical to a distance from the outer peripheral surface of the fourth securing portion 14 disposed on the cylindrical main body 11 to each of the second fastening holes 31d in the direction perpendicular to the center axis C1. As a result, when the secured portion 15 is prevented from being rotated relative to the third securing portion 13 by the male screw 100, the secured portion 15 overlaps with each of the first fastening holes 24d. When the secured portion 15 is prevented from being rotated relative to the fourth securing portion 14 by the male screw 100, the secured portion 15 overlaps with each of the second fastening holes 31d.

According to the present embodiment, the second fastening holes 31d are formed opposite to the first fastening holes 24d, respectively, in the direction of the center axis C1. Alternatively, the second fastening holes 31d may not be formed opposite to the first fastening holes 24d, respectively, in the direction of the center axis C1 as long as the fourth tightening portions T4 can be threadedly fitted to the first fastening holes 24d and the second fastening holes 31d through the secured portion 15.

Thus, when the gear device X1 according to the present embodiment is used in the state that, for example, a cable inserted into the cylindrical portion 10 is not displaced relative to the carrier 2 disposed on the stationary side of the gear device X1, the cylindrical portion 10 can be kept in the stationary state. As a result, the inner peripheral surface of the cylindrical portion 10 can be prevented from being rubbed against the cable. When the gear device X1 is used in the state that a cable inserted into the cylindrical portion 10 is displaced relative to the carrier 2 disposed on the stationary side of the gear device X1, the cylindrical portion 10 can be kept in the rotational state. As a result, the inner peripheral surface of the cylindrical portion 10 can be prevented from being rubbed against the cable. Thus, in the gear device X1, depending on how a substance inserted into the cylindrical portion 10 is used, the cylindrical portion 10 can be kept either in the rotational state or in the stationary state. As a result, the substance inserted into the cylindrical portion 10 can be prevented from being damaged.

Moreover, in the gear device X1 according to the present embodiment, when the secured portion 15 of the cylindrical portion 10 is secured to the first securing portion 24a of the other side portion 24B disposed on the main body portion 24, the cylindrical portion 10 can be kept in the stationary state. On the other hand, when the secured portion 15 of the cylindrical portion 10 is secured to the second securing portion 31a of the first portion 31 disposed on the outer cylinder 3, the cylindrical portion 10 can be kept in the rotational state. Thus, in the gear device X1, the main body portion 24 of the carrier 2 has the first securing portion 24a, whereas the first portion 31 of the outer cylinder 3 has the second securing portion 31a. As a result, just depending on whether the secured portion 15 is secured to the first securing portion 24a or the second securing portion 31a, the cylindrical portion 10 can be kept in the rotational state or the stationary state.

In the gear device X1 according to the present embodiment, the cylindrical main body 11 and the secured portion 15 are independent portions. The secured portion 15 is prevented from being rotated relative to the cylindrical main body 11 by the male screw 100. In addition, the secured portion 15 is secured either to the first securing portion 24a or to the second securing portion 31a. Thus, just depending on the position of the secured portion 15 relative to the cylindrical main body 11, the cylindrical portion 10 can be kept either in the rotational state or in the stationary state.

In the gear device X1 according to the present embodiment, the first fastening holes 24d are formed opposite to the second fastening holes 31d, respectively, in the direction of the center axis C1. Thus, when the cylindrical main body 11 and the first securing portion 24a are secured to each other or when the cylindrical main body 11 and the second securing portion 31a are secured to each other, secured portions 15 that differ in shapes or sizes do not need to be used. As a result, the secured portion 15 having a predetermined shape or a predetermined size allows the cylindrical portion 10 to be secured either to the outer cylinder 3 or to the carrier 2. Consequently, the number of parts of the gear device X1 can be reduced.

In addition, in the gear device X1 according to the present embodiment, the end surface of the first securing portion 24a is recessed in a step shape from the bottom surface S2. The end surface of the second securing portion 31a is recessed in a step shape from the upper surface S1. Thus, when the secured portion 15 is secured either to the first securing portion 24a or to the second securing portion 31a, one end portion, which is on the bottom surface S2 side, of the cylindrical main body 11 can be located at a position further toward an inner side in the direction of the center axis C1 than the bottom surface S2, and the one other end portion, which is on the upper surface S1 side, of the cylindrical main body 11 can be located at a position further toward an inner side in the direction of the center axis C1 than the upper surface S1.

Moreover, in the gear device X1 according to the present embodiment, the bearings B11 and B12 are disposed in an outer radial direction of the cylindrical main body 11 so that the bearings B11 and B12 rotatably support the cylindrical main body 11. Thus, when the cylindrical portion 10 is kept in the rotational state, the cylindrical main body 11 can be smoothly rotated.

In the gear device X1 according to the present embodiment, the cylindrical main body 11 and the secured portion 15 are independent portions. Alternatively, as illustrated in FIG. 5 and FIG. 6, the cylindrical main body 11 and the secured portion 15 may be integrally formed.

Figure 5:
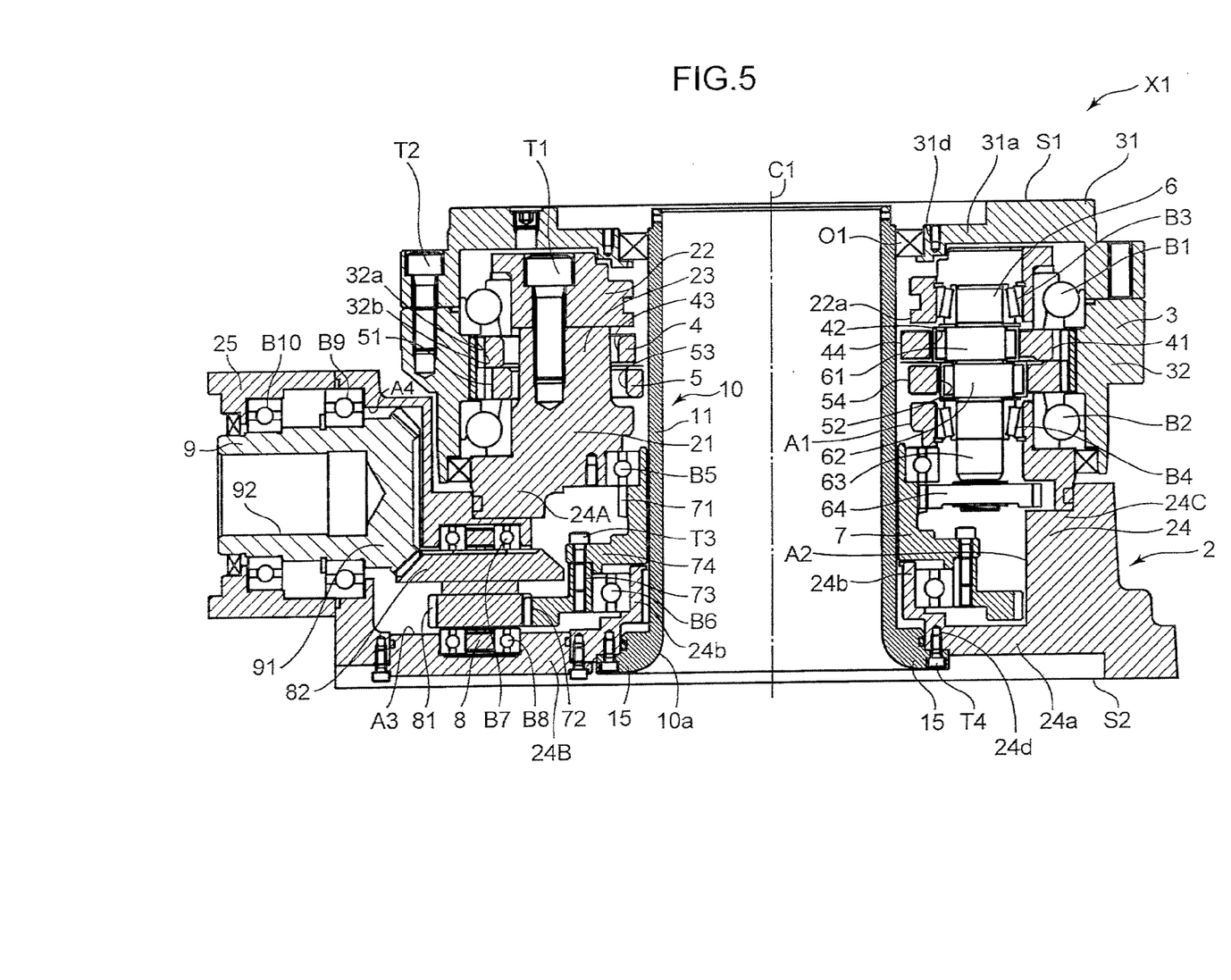
FIG. 5 is a sectional view illustrating an outlined structure of a gear device according to an exemplary modification of the present embodiment, the cylindrical portion being kept in the stationary state.

In the gear device X1 illustrated in FIG. 5, the cylindrical portion 10 is disposed in a first attitude. Specifically, the secured portion 15 is integrally formed with the cylindrical main body 11. The secured portion 15 radially protrudes outward from one end of the cylindrical main body 11 in the direction of the center axis C1. The cylindrical portion 10 is inserted from the other end of the cylindrical main body 11, where the secured portion 15 is not disposed, into the insertion holes 44 and 54 of the oscillation gears 4 and 5 and the end-plate through-hole 22a of the end plate portion 22 through the first space A1. The secured portion 15 and the first securing portion 24a are secured by the fourth tightening portion T4 at the contact position where the outer peripheral surface of the secured portion 15 is brought into contact with the end surface of the first securing portion 24a in the direction of the center axis C1. In addition, the oil seal O1 is disposed between the cylindrical main body 11 and the second securing portion 31a in the radial direction of the cylindrical main body 11 so as to allow the cylindrical main body 11 to be rotated. In the gear device X1 illustrated in FIG. 5, an inner diameter from the center axis C1 of a part of the second securing portion 31a where the oil seal O1 is mounted is the same as an inner diameter from the center axis C1 of a part of the first securing portion 24a where the secured portion 15 is mounted.

Thus, in the gear device X1 illustrated in FIG. 5, the cylindrical portion 10 is disposed in the first attitude. The entire cylindrical portion 10 is secured to the carrier 2 disposed on the stationary side of the gear device X1. Thus, when the outer cylinder 3 is coaxially rotated relative to the carrier 2, the cylindrical portion 10 is kept in the stationary state.

Figure 6:
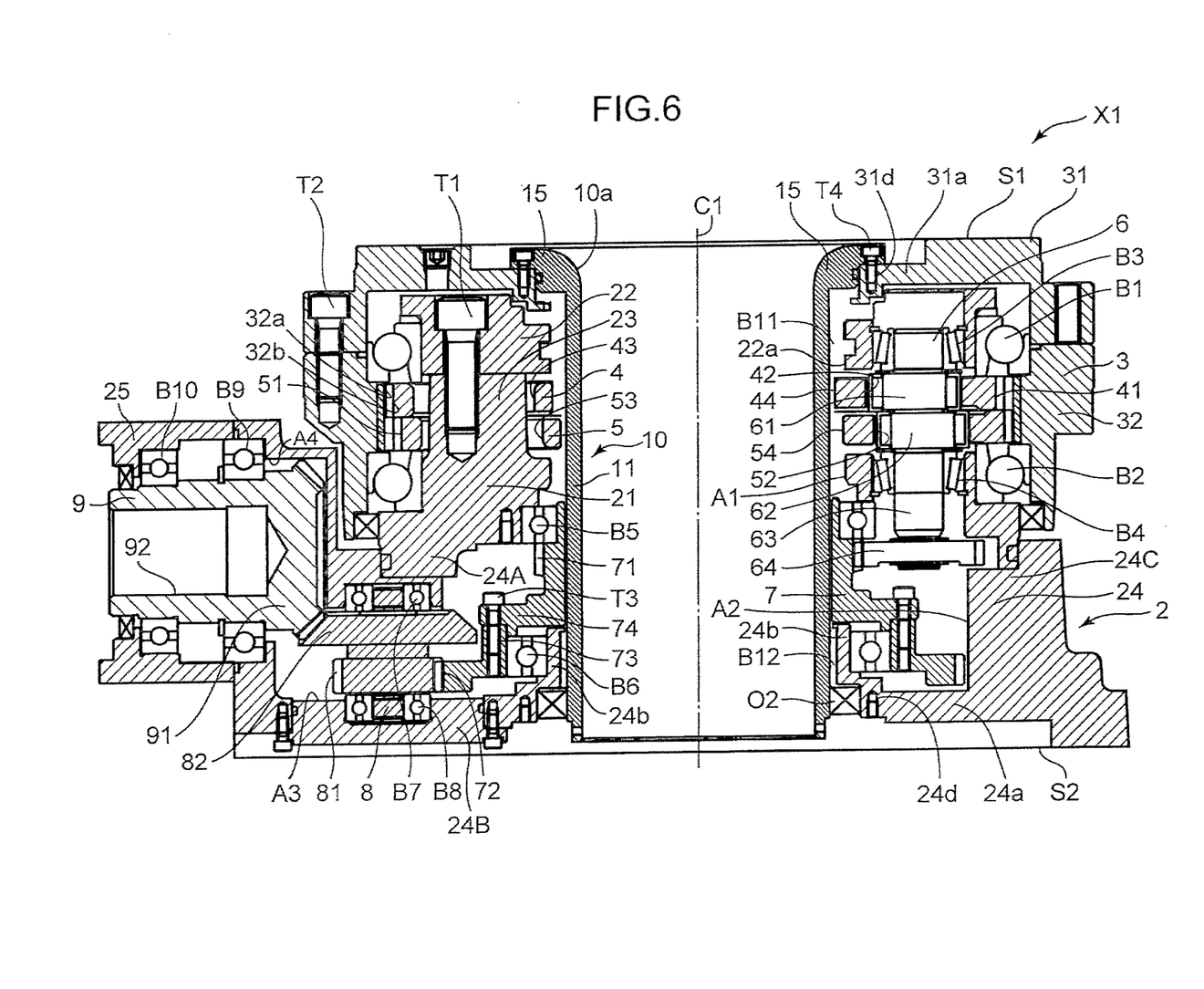
FIG. 6 is a sectional view illustrating an outlined structure of the gear device according to the exemplary modification of the present embodiment, the cylindrical portion being kept in a rotational state.

On the other hand, in the gear device X1 illustrated in FIG. 6, the cylindrical portion 10 is disposed in a second attitude. In this example, the second attitude is an attitude where the cylindrical portion 10 disposed in the first attitude illustrated in FIG. 5 is reversely disposed in the direction of the center axis C1. Specifically, in FIG. 6, the cylindrical portion 10 is inserted from the other end of the cylindrical main body 11, where the secured portion 15 is not disposed, into the first space A1 of the main body portion 24 through the end-plate through-hole 22a of the end plate portion 22 and the insertion holes 44 and 54 of the oscillation gears 4 and 5. The secured portion 15 and the second securing portion 31a are secured by the fourth tightening portion T4 at the contact position where the outer peripheral surface of the secured portion 15 is brought into contact with the end surface of the second securing portion 31a in the direction of the center axis C1. In addition, instead of the oil seal O1 of the gear device X1 illustrated in FIG. 5, the oil seal O2 that allows the cylindrical main body 11 to be rotated is disposed between the cylindrical main body 11 and the first securing portion 24a.

Thus, in the gear device X1 illustrated in FIG. 6, the cylindrical portion 10 is disposed in the second attitude. The entire cylindrical portion 10 is secured to the outer cylinder 3 disposed on the rotational side of the gear device X1. As a result, when the outer cylinder 3 is coaxially rotated relative to the carrier 2, the cylindrical portion 10 is kept in the rotational state.

Thus, in the gear device X1 illustrated in FIG. 5 and FIG. 6, the cylindrical portion 10 is disposed either in the first attitude where the secured portion 15 and the first securing portion 24a can be secured or in the second attitude where the secured portion 15 and the second securing portion 31a can be secured. Thus, even if the cylindrical main body 11 and the secured portion 15 are integrally formed, when the attitude of the cylindrical portion 10 is changed, the cylindrical portion 10 can be kept either in the stationary state or in the rotational state.

Moreover, in the gear device X1 illustrated in FIG. 5 and FIG. 6, the first attitude where the secured portion 15 and the first securing portion 24a are secured is reverse in the direction of the center axis C1 of the second attitude where the secured portion 15 and the second securing portion 31a are secured. Thus, just depending on the insertion direction of the cylindrical portion 10 into the carrier 2, the outer cylinder 3, and the oscillation gears 4 and 5, the cylindrical portion 10 can be kept either in the stationary state or in the rotational state.

Moreover, in the gear device X1 illustrated in FIG. 5 and FIG. 6, an inner peripheral surface 10a on one end side of the cylindrical main body 11, where the secured portion 15 is disposed, has a curved shape. Thus, when, for example, a cable is inserted into the cylindrical portion 10, the cable that is brought into contact with the inner peripheral surface 10a is less likely to be damaged.

Moreover, in the gear device X1 illustrated in FIG. 5 and FIG. 6, the cylindrical portion 10 is aligned at the contact position where the outer peripheral surface of the secured portion 15 is brought into contact with the end surface of the first securing portion 24a or the end surface of the second securing portion 31a in the direction of the center axis C1. As a result, in the gear device X1 illustrated in FIG. 5 and FIG. 6, the stop ring 12 can be omitted unlike the gear device X1 illustrated in FIG. 1 to FIG. 3.

In addition, the cylindrical main body 11 and the secured portion 15 are integrally formed. Thus, the secured portion 15 does not need to be prevented from being rotated relative to the cylindrical main body 11. As a result, the gear device X1 illustrated in FIG. 5 and FIG. 6 does not need to provide the male screw 100 unlike the gear device X1 illustrated in FIG. 1 to FIG. 3.

Figure 7:
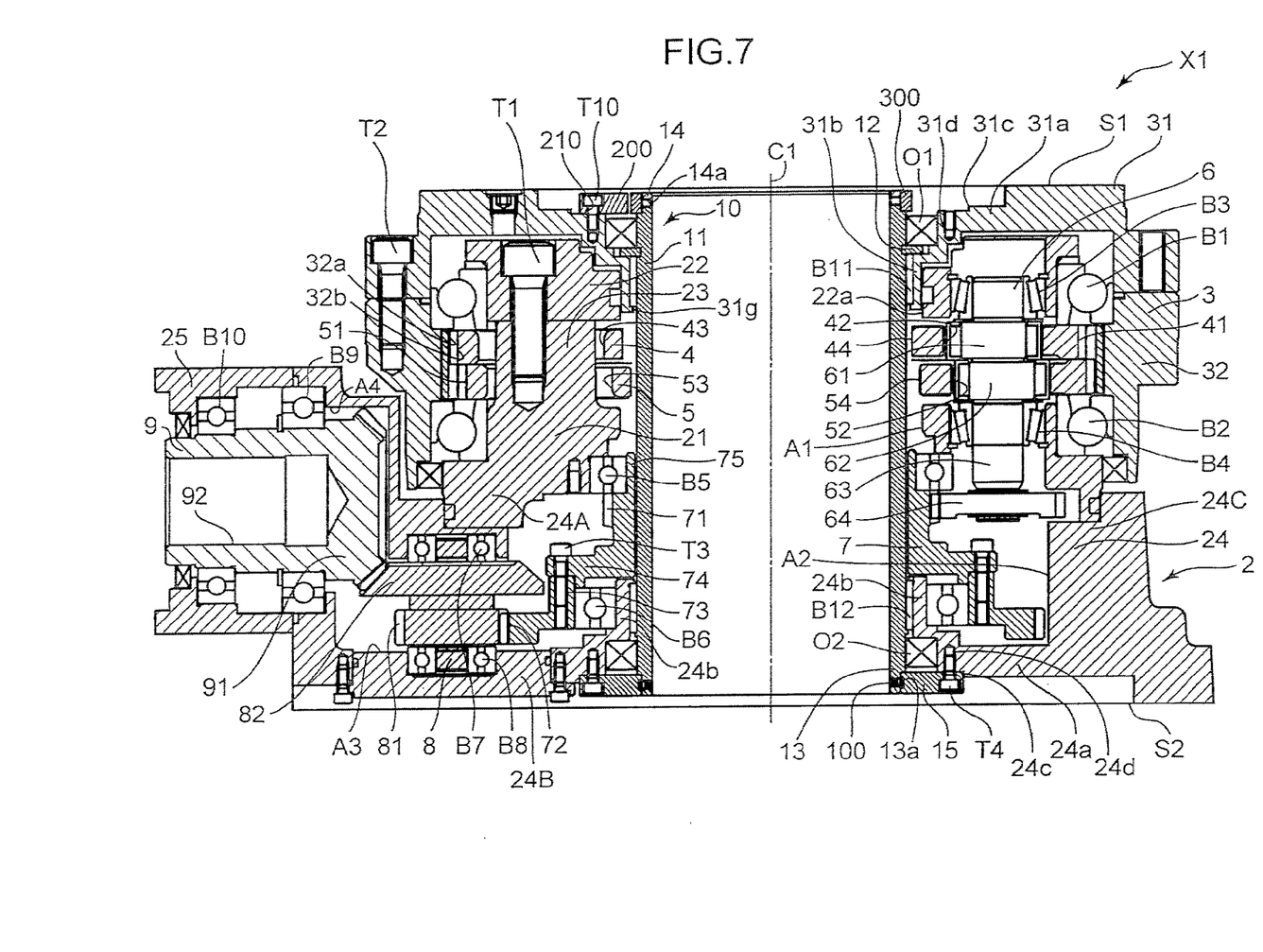
FIG. 7 is a sectional view illustrating an outlined structure of a gear device according to another exemplary modification of the present embodiment.

Alternatively, as illustrated in FIG. 7, the gear device X1 may include a position detector 200.

The gear device X1 illustrated in FIG. 7 also includes a code plate 300 in addition to the position detector 200.

The position detector 200 is secured to the second securing portion 31a. Specifically, a through-hole 210 is formed throughout the position detector 200 in the direction of the center axis C1. The position detector 200 is located so that the through-hole 210 overlaps with one of the second fastening holes 31d of the second securing portion 31a. A securing portion T10 is inserted into the second fastening hole 31d through the through-hole 210. As a result, the position detector 200 is secured to the second securing portion 31a.

The code plate 300 is a ring-shaped plate portion. The code plate 300 is disposed so that the code plate 300 peripherally surrounds the fourth securing portion 14 of the cylindrical main body 11. The code plate 300 is secured to the cylindrical main body 11 while the code plate 300 is prevented from being rotated relative to the cylindrical main body 11. The code plate 300 is radially opposite to the position detector 200.

For example, codes corresponding to rotational positions of the cylindrical portion 10 are marked on an outer peripheral surface of the code plate 300. The position detector 200 reads codes marked on the outer peripheral surface so as to detect rotational positions of the cylindrical portion 10.

Thus, in the gear device X1 illustrated in FIG. 7, which has the position detector 200, the position detector 200 can be secured to one of the first securing portion 24a and the second securing portion 31a, namely the second securing portion 31a to which the secured portion 15 is not secured.

In FIG. 7, since the secured portion 15 is secured to the first securing portion 24a, the rotational positions of the cylindrical portion 10 are not changed. Alternatively, for example the secured portion 15 may be secured to the second securing portion 31a. In such a structure, the rotational positions of the cylindrical portion 10 that are periodically changed as the outer cylinder 3 is rotated can be detected by the position detector 200.

The foregoing embodiment and exemplary modifications are examples of the present invention, not limitations of the present invention. The scope of the present invention is represented by the scope of claim, not the description of the foregoing embodiment and exemplary modifications. In addition, the foregoing and various other changes, omissions, and additions in the form and detail thereof may be made therein without departing from the spirit and scope of the present invention.

For example, in the gear devices X1 according to the foregoing embodiment and exemplary modifications, the secured portion 15 is disposed at either the one end portion or the other end portion of the cylindrical main body 11, the one end portion and the other end portion being disposed in the direction of the center axis C1. Alternatively, the secured portion 15 may be disposed inside of both the end portions of the cylindrical main body 11 in the direction of the center axis C1 as long as the secured portion 15 is secured either to the carrier 2 or to the outer cylinder 3.

In the gear devices X1 according to the foregoing embodiment and exemplary modifications, torque is input from a direction perpendicular to the center axis C1. The torque is orthogonally converted into torque in the direction of the center axis C1 and then output. Alternatively, an axial direction of input torque may be identical to an axial direction of output torque.

In the gear devices X1 according to the foregoing embodiment and exemplary modifications, torque that is input from the input shaft 9 is transferred to the transmission gear 7 through the axial direction conversion unit 8. Alternatively, the axial direction conversion unit 8 may be omitted. In this case, torque that is input from the input shaft 9 is directly transferred to the transmission gear 7.

In the gear devices X1 according to the foregoing embodiment and exemplary modifications, the outer cylinder 3 is disposed on the rotational side of the gear device X1, whereas the carrier 2 is disposed on the stationary side of the gear device X1. Alternatively, the outer cylinder 3 may be disposed on the stationary side of the gear device X1, whereas the carrier 2 may be disposed on the rotational side of the gear device X1. In this case, when the secured portion 15 is secured to the first securing portion 24a of the carrier 2, the cylindrical portion 10 is kept in the rotational state. When the secured portion 15 is secured to the second securing portion 31a of the outer cylinder 3, the secured portion 15 is kept in the stationary state.

The foregoing embodiment includes the following structures of the present invention. A gear device according to the present invention includes: A gear device comprising: a crankshaft that has an eccentric portion; an oscillation gear that has a plurality of external teeth and oscillating and rotating due to rotation of the eccentric portion; a carrier that rotatably supports the crankshaft; an outer cylinder that has a plurality of internal teeth respectively engaged with the external teeth of the oscillation gear; and a cylindrical portion that extends through the oscillation gear, the carrier, and the outer cylinder in an axial direction of the outer cylinder, wherein the carrier and the outer cylinder coaxially and relatively rotate due to oscillation and rotation of the oscillation gear, and the cylindrical portion is disposed in either a rotational state, in which the cylindrical portion rotates, or a stationary state, in which the cylindrical portion does not rotate, depending on relative rotation of the carrier and the outer cylinder.

In the foregoing gear device, when, for example, a cable inserted into the cylindrical portion is kept in the stationary state relative to the carrier or the outer cylinder disposed on the stationary side of the gear device, the cable can be prevented from being rubbed against the cylindrical portion. On the other hand, when a cable inserted into the cylindrical portion is kept in the rotational state relative to the carrier or the outer cylinder disposed on the stationary side of the gear device, the cable can be prevented from being rubbed against the cylindrical portion. Thus, in the foregoing gear device, since the cylindrical portion is kept in either the rotational state or the stationary state depending on how a substance inserted into the cylindrical portion is used, the substance inserted into the cylindrical portion can be prevented from being damaged.

The cylindrical portion preferably has a secured portion. The carrier preferably has a first securing portion that is capable of securing the secured portion. The outer cylinder preferably has a second securing portion that is capable of securing the secured portion.

In the foregoing gear device, when the secured portion of the cylindrical portion is secured to the securing portion of either the carrier or the outer cylinder that is disposed on the stationary side of the gear device, the cylindrical portion can be kept in the stationary state. On the other hand, when the secured portion of the cylindrical portion is secured to the securing portion of either the carrier or the outer cylinder that is disposed on the rotational side of the gear device, the cylindrical portion can be kept in the rotational side. Thus, according to the foregoing gear device, each of the carrier and the outer cylinder has the securing portion that is secured to the secured portion of the cylindrical portion. Thus, just depending on which securing portion of the carrier or the outer cylinder the secured portion of the cylindrical portion is secured, the cylindrical portion can be kept either in the rotational state or in the stationary state.

The cylindrical portion preferably has a cylindrical main body that is a portion independent from the secured portion and a detent portion that prevents the secured portion from being rotate relative to the cylindrical main body.

In the foregoing gear device, since the cylindrical main body and the secured portion are independent portions, by just depending on the position of the secured portion relative to the cylindrical main body, the secured portion can be secured to either the first securing portion or the second securing portion. In addition, the detent portion prevents the secured portion from being rotated relative to the cylindrical main body. Thus, the cylindrical portion can be securely kept either in the rotational side or in the stationary state.

The cylindrical portion preferably has a cylindrical main body integrally formed with the secured portion. The cylindrical portion is preferably disposed either in a first attitude or in a second attitude, with the second attitude being reverse of the first attitude in terms of an orientation of the cylindrical main body in the axial direction of the outer cylinder. The secured portion is preferably secured to the first securing portion when the cylindrical portion is disposed in the first attitude and the secured portion is secured to the second securing portion when the cylindrical portion is disposed in the second attitude.

In the foregoing gear device, the first attitude of the cylindrical portion is reverse of the second attribute in an orientation of the cylindrical main body in the axial direction of the outer cylinder. Thus, for example, when the cylindrical portion is inserted into the outer cylinder, the oscillation gears, and the carrier from one side in the axial direction of the outer cylinder, the cylindrical portion is disposed in the first attitude. In contrast, for example when the cylindrical portion is inserted into the carrier, the oscillation gears, and the outer cylinder from the other side in the axial direction of the outer cylinder, the cylindrical portion is disposed in the second attitude. When the cylindrical portion is disposed in the first attitude, the secured portion is secured to the first securing portion. When the cylindrical portion is disposed in the second attitude, the secured portion is secured to the second securing portion. Thus, just depending on the direction in which the cylindrical portion is inserted into the outer cylinder, the oscillation gears, and the carrier, the cylindrical portion can be kept either in the rotational state or in the stationary state.

The gear device preferably further includes bearings that are disposed in an outer radial direction of the cylindrical portion and that rotatably support the cylindrical portion.

According to the foregoing gear device, since the cylindrical portion is rotatably supported by the bearings, when the cylindrical portion is kept in the rotational state, the cylindrical portion can be smoothly rotated.

The secured portion is preferably secured to one of the first securing portion and the second securing portion. The gear device preferably further includes a position detector secured to other one of the first securing portion and the second securing portion, to which the secured portion is not secured.

According to the foregoing gear device, the position detector can be secured to either one of the first securing portion and the second securing portion, to which the secured portion is not secured.

This application is based on Japanese Patent application No. 2014-112921 filed in Japan Patent Office on May 30, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gear device comprising:
   a crankshaft that has an eccentric portion;
   an oscillation gear that has a plurality of external teeth and oscillating and rotating due to rotation of the eccentric portion;
   a carrier that rotatably supports the crankshaft;
   an outer cylinder that has a plurality of internal teeth respectively engaged with the external teeth of the oscillation gear; and
   a cylindrical portion including a cylindrical main body and a secured portion which is detachable from the cylindrical main body, the cylindrical main body extending through the oscillation gear, the carrier, and the outer cylinder in an axial direction of the outer cylinder,
   wherein the carrier and the outer cylinder coaxially and relatively rotate due to oscillation and rotation of the oscillation gear,
   wherein the cylindrical portion is disposed in either a rotational state, in which the cylindrical portion rotates under relative rotation of the carrier and the outer cylinder, or a stationary state, in which the cylindrical portion does not rotate, and
   wherein the outer cylinder includes a securing portion to which the secured portion is secured when the cylindrical portion is disposed in the rotational state, and
   wherein the cylindrical main body protrudes from the securing portion when the cylindrical portion is disposed in the stationary state, and is inserted into and fixed to the secured portion on the securing portion when the cylindrical portion is disposed in the rotational state.

2. The gear device according to claim 1, wherein the carrier also has a securing portion that is capable of securing the secured portion.

3. The gear device according to claim 2, wherein the cylindrical portion has a detent portion that prevents the secured portion from being rotated relative to the cylindrical main body.

4. The gear device according to claim 1, further comprising: a bearing that is disposed in an outer radial direction of the cylindrical portion and that rotatably supports the cylindrical portion.

5. The gear device according to claim 2, wherein the secured portion is secured to one of the securing portion of the carrier and the securing portion of the outer cylinder, the gear device further comprising a position detector secured to the other one of the securing portion of the carrier and the securing portion of the outer cylinder, to which the secured portion is not secured.

* * * * *